(No Model.)  2 Sheets—Sheet 1.

P. DIEHL.
ELECTRIC MOTOR.

No. 350,668. Patented Oct. 12, 1886.

WITNESSES:
Alphonse Walter
Thomas Kramer

INVENTOR
Philip Diehl (No Model.) 2 Sheets—Sheet 2.

P. DIEHL.
ELECTRIC MOTOR.

No. 350,668. Patented Oct. 12, 1886.

WITNESSES:
Alphonse Walter
Thomas Kraemer

INVENTOR
Philip Diehl

UNITED STATES PATENT OFFICE.

PHILIP DIEHL, OF ELIZABETH, NEW JERSEY.

ELECTRIC MOTOR.

SPECIFICATION forming part of Letters Patent No. 350,668, dated October 12, 1886.

Application filed July 9, 1886. Serial No. 207,539. (No model.)

*To all whom it may concern:*

Be it known that I, PHILIP DIEHL, a citizen of the United States, residing at Elizabeth, in the county of Union and State of New Jersey, have invented certain new and useful Improvements in Electric Motors, of which the following is a specification, reference being had to the accompanying drawings.

My invention relates to certain improvements in electric motors; and it consists, mainly, in the peculiar construction of the revolving armature and commutator, as hereinafter fully described, and pointed out in the claims.

The object of the invention is to provide an electric motor with an armature and commutator simple in construction, therefore cheap to manufacture, and which shall operate satisfactorily.

Figure 1:
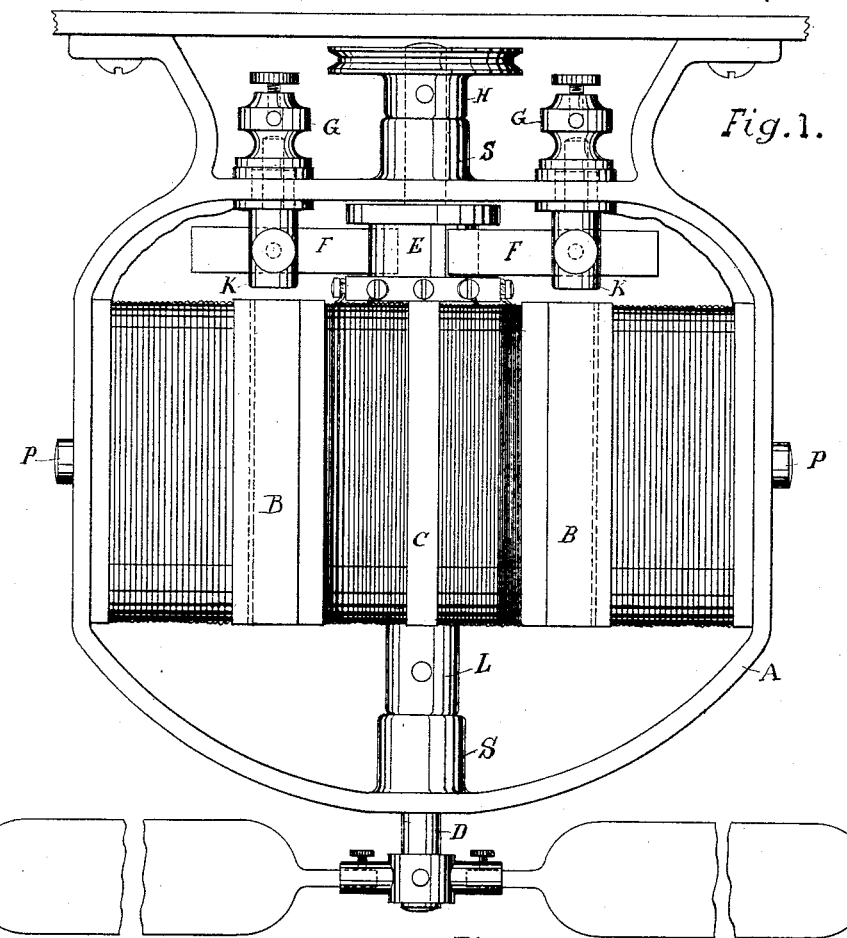
Figure 2:
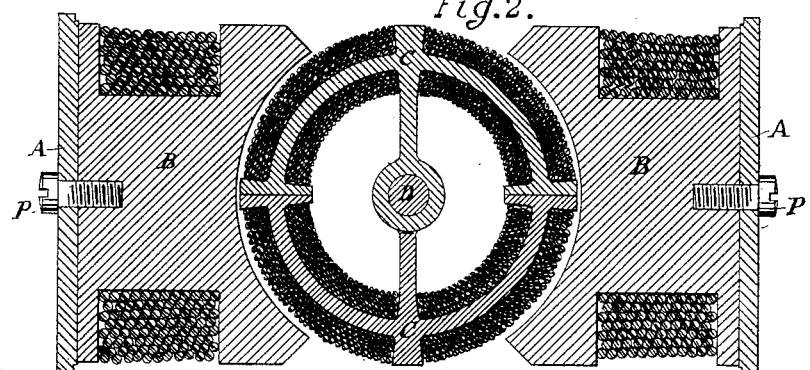
Figure 3:
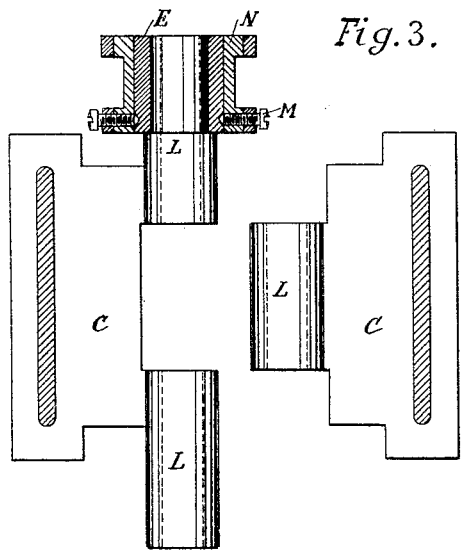
Figure 4:
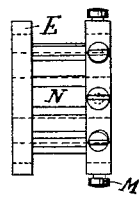
Figure 5:
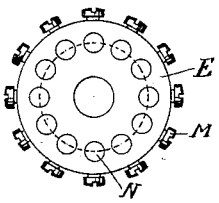

In the accompanying drawings, Figure 1 is a front elevation of an electric motor embodying the features of my invention. Fig. 2 is a cross-section showing the field-magnets and armature. Fig. 3 represents the armature core or ring in sections, and portions of hub with shaft removed. Figs. 4 and 5 represent views of the commutator.

Referring to the figures, A represents an iron frame, provided with lugs to form a hanger, so that it may be fastened in a vertical or a horizontal position to a wall or ceiling when used to drive a fan, as shown in Fig. 1. Frame A is provided with thickened portions, in which the bearings for the armature-shaft D are formed. Field-magnets B are cast-iron pieces, grooved around their circumference for the reception of the insulated wire which is wound around them, said pieces being curved to partly encircle the armature, and being fastened within the frame A by screws. The armature ring or core C is made in halves, as shown in Figs. 2 and 3, and is covered with insulated wire wound in coils, as is usual in armatures of the Gramme type. The coils are connected among themselves and to the commutator, as usual. With each half of ring or core C is integral a portion of hub L. Hub L of each half is provided with a hole, in which shaft D is fitted to hold together the halves to make a complete ring. Each half of armature core or ring C can be wound separately, and then put together to form a complete ring, instead of having to wind a solid ring, which is difficult, especially on small armatures. The hub L of armature is of sufficient length to fill the space between the bearings S S of frame A, and also to provide a seat for the commutator upon it. The brushes F are held in the brush-holders K and bear on the commutator E. Brush-holders K are insulated from frame A, and securely held in place by screw-threaded nuts, which also form the binding-posts to attach the terminals of the source of electricity. The body of the commutator E is of vulcanized fiber, wood, or any other suitable non-conducting material, the said body having at its ends radial flanges. The body of the commutator has also a series of longitudinal holes passing through the said flanges, the number of the said holes being equal to the number of the armature-coils. In the said holes are fastened, by radial set-screws M, passing through one of the said flanges, pieces of copper wire N, constituting the metallic commutator-sections. The round pieces of wire are turned down between the flanges, so that their outer faces will be flattened, and they will thus form a smooth surface for the brushes F to bear against.

The coils of the field-magnets and armature may be connected in series or any other way employed in dynamos or electric motors.

It is evident that instead of making the armature core or ring in two sections it may be divided into more without departing from my invention.

What I claim is—

1. An armature for an electric motor, consisting of a sectional or divided ring, each of the sections of the body of the said ring having a hub portion provided with an opening for the reception of the shaft by which the sections of the armature are held together, substantially as set forth.

2. An armature for an electric motor, consisting of a sectional or divided ring, the sections of which are adapted to be held together by a central shaft, substantially as set forth.

3. The combination, with the armature ring or core sections C, having hub-pieces L, with central openings, of the shaft D, fitting in the said openings, and serving to hold the said ring or core sections together, substantially as set forth.

4. The combination, with the frame A and the field-magnets B, secured thereto, of the divided-ring armature, consisting of sections having hub portions provided with openings, and the shaft by which the said sections are held together, substantially as set forth.

5. A commutator consisting of a non-conducting body having radial end flanges, said body having a series of longitudinal holes passing through the said flanges, a series of metallic sections or pieces fitting in said holes and having flattened outer faces between said flanges, and a series of radial set-screws passing through one of said flanges, and serving to secure the said commutator-sections in place, substantially as set forth.

In testimony whereof I affix my signature in presence of two witnesses.

PHILIP DIEHL.

Witnesses:
 JAS. T. SHAW,
 L. L. BURRITT.